US012057908B2

(12) United States Patent
Qureshi et al.

(10) Patent No.: US 12,057,908 B2
(45) Date of Patent: Aug. 6, 2024

(54) HYBRID BEAMFORMING FOR UPLINK TRANSMISSION

(71) Applicant: NOKIA SOLUTIONS AND NETWORKS OY, Espoo (FI)

(72) Inventors: Muhammad Ayyaz Qureshi, Neu-Ulm (DE); Tilman Felgentreff, Holzkirchen (DE); Martin Steiert, Blaustein (DE); Suresh Kalyanasundaram, Bangalore (IN); Shalini Gulati, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/515,666

(22) Filed: Nov. 21, 2023

(65) Prior Publication Data
US 2024/0204838 A1    Jun. 20, 2024

(30) Foreign Application Priority Data
Dec. 16, 2022    (FI) ..................................... 20226117

(51) Int. Cl.
H04W 4/00    (2018.01)
H04B 7/0408    (2017.01)
(Continued)

(52) U.S. Cl.
CPC ......... H04B 7/0617 (2013.01); H04B 7/0408 (2013.01); H04B 7/0877 (2013.01)

(58) Field of Classification Search
CPC ... H04B 7/0617; H04B 7/0408; H04B 7/0877
(Continued)

(56) References Cited

U.S. PATENT DOCUMENTS 9,692,489 B1 * 6/2017 Rofougaran ........... H04B 7/185
11,147,069 B1 * 10/2021 Chopra ................ H04B 7/0413
(Continued)

FOREIGN PATENT DOCUMENTS

WO    2021/142374 A1    7/2021
WO    2021/160689 A1    8/2021
WO    2022/017597 A1    1/2022

OTHER PUBLICATIONS

Office Action—First Opinion on Patentability dated Apr. 20, 2023 corresponding to Finnish Patent Application No. 20226117.
(Continued)

Primary Examiner — Marceau Milord
(74) Attorney, Agent, or Firm — SQUIRE PATTON BOGGS (US) LLP

(57) ABSTRACT

A method and apparatus determine a transmission beam for downlink transmissions, and provides first beamforming instructions for forming the transmission beam to a transmission path. The method and apparatus also determine at least one receiving beam that is a first receiving beam, and at least one receiving beam that is a second receiving beam. A first antenna sub-array is configured to provide a first plurality of concurrent receiving beams and a second antenna sub-array is configured to provide a second plurality of concurrent receiving beams, providing second beamforming instructions, for forming at least the first receiving beam and at least the second receiving beams, to a first receiving path and a second receiving path, respectively.

15 Claims, 4 Drawing Sheets

(51) Int. Cl.
*H04B 7/06* (2006.01)
*H04B 7/08* (2006.01)

(58) Field of Classification Search
USPC .......................................................... 370/329
See application file for complete search history.

(56) References Cited

U.S. PATENT DOCUMENTS

| | | | | |
|---|---|---|---|---|
| 11,343,681 | B1* | 5/2022 | Kim | H04W 16/28 |
| 11,770,809 | B2* | 9/2023 | Xu | H04B 7/0452 |
| | | | | 370/330 |
| 11,901,977 | B2* | 2/2024 | Al-Mahdawi | H04B 7/0617 |
| 11,923,952 | B2* | 3/2024 | Maltsev | H04B 7/10 |
| 2009/0009392 | A1* | 1/2009 | Jacomb-Hood | H01Q 1/288 |
| | | | | 342/374 |
| 2009/0074109 | A1 | 3/2009 | Foo | |
| 2013/0301454 | A1 | 11/2013 | Seol et al. | |
| 2016/0248157 | A1* | 8/2016 | Rao | H01Q 3/2694 |
| 2017/0229774 | A1* | 8/2017 | Schuehler | H04B 7/0617 |
| 2018/0069296 | A1* | 3/2018 | Rofougaran | H01Q 3/40 |
| 2019/0081693 | A1 | 3/2019 | Eitan et al. | |
| 2020/0335878 | A1* | 10/2020 | Rofougaran | H01Q 23/00 |
| 2020/0350697 | A1* | 11/2020 | Rofougaran | H01Q 3/38 |
| 2020/0350698 | A1* | 11/2020 | Rofougaran | H01Q 1/523 |
| 2022/0200147 | A1 | 6/2022 | Horn et al. | |
| 2022/0271442 | A1* | 8/2022 | Rofougaran | H01Q 3/26 |
| 2022/0286169 | A1* | 9/2022 | Chopra | H04B 7/0617 |
| 2022/0416446 | A1* | 12/2022 | Rofougaran | H01Q 25/001 |
| 2023/0033070 | A1* | 2/2023 | Vigano | H04B 7/0408 |
| 2023/0093195 | A1* | 3/2023 | Milroy | H01Q 3/28 |
| | | | | 455/273 |
| 2024/0097751 | A1* | 3/2024 | Sung | H04W 28/24 |

OTHER PUBLICATIONS

Finnish Search Report dated Apr. 20, 2023 corresponding to Finnish Patent Application No. 20226117.
Office Action—Communication of Acceptance dated Sep. 25, 2023 corresponding to Finnish Patent Application No. 20226117.
3GPP TS 38.817-02 V15.10.0 (Sep. 2022), Technical Specification, 3rd Generation Partnership Project; Technical Specification Group Radio Access Network; NR; General aspects for Base Station (BS) Radio Frequency (RF) for NR (Release 15), Sep. 26, 2022.
Extended European Search Report corresponding to EP Appln. No. 23210509.8, dated May 22, 2024.

* cited by examiner

HYBRID BEAMFORMING FOR UPLINK TRANSMISSION

CROSS REFERENCE TO RELATED APPLICATION

This application claims the benefit of Finnish Patent Application No. 20226117, filed Dec. 16, 2022. The entire content of the above-referenced application is hereby incorporated by reference.

FIELD

The following exemplary embodiments relate to wireless communication and using hybrid beamforming for uplink transmissions.

BACKGROUND

Wireless communication networks, such as cellular communication networks evolve and techniques that enable improved coverage and enhanced capacity are of interest. Also, techniques are to be developed to achieve desired capabilities in the wireless communication. Beamforming where multiple columns of antenna elements work together to create a high gain signal can be utilized for enhanced coverage.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising means for performing: determining a transmission beam for downlink transmissions, providing first beamforming instructions, for forming the transmission beam, to a transmission path comprising a digital to analog converter and an antenna column that comprises at least a first antenna sub-array and a second antenna sub-array and wherein the first antenna sub-array is connected to a first phase shifter comprising a first pair of switches connected using delay lines, and the second antenna sub-array is connected to a second phase shifter comprising a second pair of switches connected using delay lines, and wherein the first phase shifter and the second phase shifter are both connected to the digital to analog converter, determining, for the first antenna sub-array, at least one receiving beam that is a first receiving beam, and for the second antenna sub-array, at least one receiving beam that is a second receiving beam for receiving uplink transmissions, wherein the first antenna sub-array is capable of providing a first plurality of concurrent receiving beams and the second antenna sub-array is capable of providing a second plurality of concurrent receiving beams, providing second beamforming instructions, for forming at least the first receiving beam and at least the second receiving beams, to a first receiving path and a second receiving path, respectively, wherein the first receiving path comprises the first phase shifter that is connected to the first antenna sub-array and to a first analog to digital converter, and the second receiving path comprises the second phase shifter that is connected to the second antenna sub-array and to a second analog to digital converter, and wherein the first receiver path is connected to the first phase shifter using a first dedicated switch state associated with the first pair of switches, and the second receiver path is connected to the second phase shifter using a second dedicated switch state associated with the second pair of switches, and transmitting the downlink transmissions using the transmission beam and receiving the uplink transmissions using the first and the second receiving beams.

In some example embodiments according to the first aspect, the means comprises at least one processor, and at least one memory storing instructions that, when executed by the at least one processor, to cause the performance of the apparatus.

According to a second aspect there is provided an apparatus comprising at least one processor, and at least one memory storing instructions that, when executed by the at least one processor, to cause the apparatus at least to perform: determine a transmission beam for downlink transmissions, provide first beamforming instructions, for forming the transmission beam, to a transmission path comprising a digital to analog converter and an antenna column that comprises at least a first antenna sub-array and a second antenna sub-array and wherein the first antenna sub-array is connected to a first phase shifter comprising a first pair of switches connected using delay lines, and the second antenna sub-array is connected to a second phase shifter comprising a second pair of switches connected using delay lines, and wherein the first phase shifter and the second phase shifter are both connected to the digital to analog converter, determine, for the first antenna sub-array, at least one receiving beam that is a first receiving beam, and for the second antenna sub-array, at least one receiving beam that is a second receiving beam for receiving uplink transmissions, wherein the first antenna sub-array is capable of providing a first plurality of concurrent receiving beams and the second antenna sub-array is capable of providing a second plurality of concurrent receiving beams, provide second beamforming instructions, for forming at least the first receiving beam and at least the second receiving beams, to a first receiving path and a second receiving path, respectively, wherein the first receiving path comprises the first phase shifter that is connected to the first antenna sub-array and to a first analog to digital converter, and the second receiving path comprises the second phase shifter that is connected to the second antenna sub-array and to a second analog to digital converter, and wherein the first receiver path is connected to the first phase shifter using a first dedicated switch state associated with the first pair of switches, and the second receiver path is connected to the second phase shifter using a second dedicated switch state associated with the second pair of switches, and transmit the downlink transmissions using the transmission beam and receive the uplink transmissions using the first and the second receiving beams.

According to a third aspect there is provided a method comprising: determining a transmission beam for downlink transmissions, providing first beamforming instructions, for forming the transmission beam, to a transmission path comprising a digital to analog converter and an antenna column that comprises at least a first antenna sub-array and a second antenna sub-array and wherein the first antenna sub-array is connected to a first phase shifter comprising a first pair of switches connected using delay lines, and the second antenna sub-array is connected to a second phase shifter comprising a second pair of switches connected using delay lines, and wherein the first phase shifter and the second phase shifter are both connected to the digital to analog converter, determining, for the first antenna sub-array, at least one receiving beam that is a first receiving beam, and for the second antenna sub-array, at least one receiving beam that is a second receiving beam for receiving uplink transmissions, wherein the first antenna sub-array is capable of providing a first plurality of concurrent receiving beams and the second antenna sub-array is capable of providing a second plurality of concurrent receiving beams, providing second beamforming instructions, for forming at least the first receiving beam and at least the second receiving beams, to a first receiving path and a second receiving path, respectively, wherein the first receiving path comprises the first phase shifter that is connected to the first antenna sub-array and to a first analog to digital converter, and the second receiving path comprises the second phase shifter that is connected to the second antenna sub-array and to a second analog to digital converter, and wherein the first receiver path is connected to the first phase shifter using a first dedicated switch state associated with the first pair of switches, and the second receiver path is connected to the second phase shifter using a second dedicated switch state associated with the second pair of switches, and transmitting the downlink transmissions using the transmission beam and receiving the uplink transmissions using the first and the second receiving beams.

In some example embodiments according to the third aspect, the method is a computer-implemented method.

According to a fourth aspect there is provided a computer program comprising instructions for causing an apparatus to perform at least the following: determine a transmission beam for downlink transmissions, provide first beamforming instructions, for forming the transmission beam, to a transmission path comprising a digital to analog converter and an antenna column that comprises at least a first antenna sub-array and a second antenna sub-array and wherein the first antenna sub-array is connected to a first phase shifter comprising a first pair of switches connected using delay lines, and the second antenna sub-array is connected to a second phase shifter comprising a second pair of switches connected using delay lines, and wherein the first phase shifter and the second phase shifter are both connected to the digital to analog converter, determine, for the first antenna sub-array, at least one receiving beam that is a first receiving beam, and for the second antenna sub-array, at least one receiving beam that is a second receiving beam for receiving uplink transmissions, wherein the first antenna sub-array is capable of providing a first plurality of concurrent receiving beams and the second antenna sub-array is capable of providing a second plurality of concurrent receiving beams, provide second beamforming instructions, for forming at least the first receiving beam and at least the second receiving beams, to a first receiving path and a second receiving path, respectively, wherein the first receiving path comprises the first phase shifter that is connected to the first antenna sub-array and to a first analog to digital converter, and the second receiving path comprises the second phase shifter that is connected to the second antenna sub-array and to a second analog to digital converter, and wherein the first receiver path is connected to the first phase shifter using a first dedicated switch state associated with the first pair of switches, and the second receiver path is connected to the second phase shifter using a second dedicated switch state associated with the second pair of switches, and transmit the downlink transmissions using the transmission beam and receive the uplink transmissions using the first and the second receiving beams.

According to a fifth aspect there is provided a computer program comprising instructions stored thereon for performing at least the following: determining a transmission beam for downlink transmissions, providing first beamforming instructions, for forming the transmission beam, to a transmission path comprising a digital to analog converter and an antenna column that comprises at least a first antenna sub-array and a second antenna sub-array and wherein the first antenna sub-array is connected to a first phase shifter comprising a first pair of switches connected using delay lines, and the second antenna sub-array is connected to a second phase shifter comprising a second pair of switches connected using delay lines, and wherein the first phase shifter and the second phase shifter are both connected to the digital to analog converter, determining, for the first antenna sub-array, at least one receiving beam that is a first receiving beam, and for the second antenna sub-array, at least one receiving beam that is a second receiving beam for receiving uplink transmissions, wherein the first antenna sub-array is capable of providing a first plurality of concurrent receiving beams and the second antenna sub-array is capable of providing a second plurality of concurrent receiving beams, providing second beamforming instructions, for forming at least the first receiving beam and at least the second receiving beams, to a first receiving path and a second receiving path, respectively, wherein the first receiving path comprises the first phase shifter that is connected to the first antenna sub-array and to a first analog to digital converter, and the second receiving path comprises the second phase shifter that is connected to the second antenna sub-array and to a second analog to digital converter, and wherein the first receiver path is connected to the first phase shifter using a first dedicated switch state associated with the first pair of switches, and the second receiver path is connected to the second phase shifter using a second dedicated switch state associated with the second pair of switches, and transmitting the downlink transmissions using the transmission beam and receiving the uplink transmissions using the first and the second receiving beams.

According to a sixth aspect there is provided a non-transitory computer readable medium comprising program instructions for causing an apparatus to perform at least the following: determine a transmission beam for downlink transmissions, provide first beamforming instructions, for forming the transmission beam, to a transmission path comprising a digital to analog converter and an antenna column that comprises at least a first antenna sub-array and a second antenna sub-array and wherein the first antenna sub-array is connected to a first phase shifter comprising a first pair of switches connected using delay lines, and the second antenna sub-array is connected to a second phase shifter comprising a second pair of switches connected using delay lines, and wherein the first phase shifter and the second phase shifter are both connected to the digital to analog converter, determine, for the first antenna sub-array, at least one receiving beam that is a first receiving beam, and for the second antenna sub-array, at least one receiving beam that is a second receiving beam for receiving uplink transmissions, wherein the first antenna sub-array is capable of providing a first plurality of concurrent receiving beams and the second antenna sub-array is capable of providing a second plurality of concurrent receiving beams, provide second beamforming instructions, for forming at least the first receiving beam and at least the second receiving beams, to a first receiving path and a second receiving path, respectively, wherein the first receiving path comprises the first phase shifter that is connected to the first antenna sub-array and to a first analog to digital converter, and the second receiving path comprises the second phase shifter that is connected to the second antenna sub-array and to a second analog to digital converter, and wherein the first receiver path is connected to the first phase shifter using a first dedicated switch state associated with the first pair of switches, and the second receiver path is connected to the second phase shifter using a second dedicated switch state associated with the second pair of switches, and transmit the downlink transmissions using the transmission beam and receive the uplink transmissions using the first and the second receiving beams.

According to a seventh aspect there is provided a non-transitory computer readable medium comprising program instructions stored thereon for performing at least the following: determining a transmission beam for downlink transmissions, providing first beamforming instructions, for forming the transmission beam, to a transmission path comprising a digital to analog converter and an antenna column that comprises at least a first antenna sub-array and a second antenna sub-array and wherein the first antenna sub-array is connected to a first phase shifter comprising a first pair of switches connected using delay lines, and the second antenna sub-array is connected to a second phase shifter comprising a second pair of switches connected using delay lines, and wherein the first phase shifter and the second phase shifter are both connected to the digital to analog converter, determining, for the first antenna sub-array, at least one receiving beam that is a first receiving beam, and for the second antenna sub-array, at least one receiving beam that is a second receiving beam for receiving uplink transmissions, wherein the first antenna sub-array is capable of providing a first plurality of concurrent receiving beams and the second antenna sub-array is capable of providing a second plurality of concurrent receiving beams, providing second beamforming instructions, for forming at least the first receiving beam and at least the second receiving beams, to a first receiving path and a second receiving path, respectively, wherein the first receiving path comprises the first phase shifter that is connected to the first antenna sub-array and to a first analog to digital converter, and the second receiving path comprises the second phase shifter that is connected to the second antenna sub-array and to a second analog to digital converter, and wherein the first receiver path is connected to the first phase shifter using a first dedicated switch state associated with the first pair of switches, and the second receiver path is connected to the second phase shifter using a second dedicated switch state associated with the second pair of switches, and transmitting the downlink transmissions using the transmission beam and receiving the uplink transmissions using the first and the second receiving beams.

According to an eighth aspect there is provided a computer readable medium comprising program instructions stored thereon for performing at least the following: determining a transmission beam for downlink transmissions, providing first beamforming instructions, for forming the transmission beam, to a transmission path comprising a digital to analog converter and an antenna column that comprises at least a first antenna sub-array and a second antenna sub-array and wherein the first antenna sub-array is connected to a first phase shifter comprising a first pair of switches connected using delay lines, and the second antenna sub-array is connected to a second phase shifter comprising a second pair of switches connected using delay lines, and wherein the first phase shifter and the second phase shifter are both connected to the digital to analog converter, determining, for the first antenna sub-array, at least one receiving beam that is a first receiving beam, and for the second antenna sub-array, at least one receiving beam that is a second receiving beam for receiving uplink transmissions, wherein the first antenna sub-array is capable of providing a first plurality of concurrent receiving beams and the second antenna sub-array is capable of providing a second plurality of concurrent receiving beams, providing second beamforming instructions, for forming at least the first receiving beam and at least the second receiving beams, to a first receiving path and a second receiving path, respectively, wherein the first receiving path comprises the first phase shifter that is connected to the first antenna sub-array and to a first analog to digital converter, and the second receiving path comprises the second phase shifter that is connected to the second antenna sub-array and to a second analog to digital converter, and wherein the first receiver path is connected to the first phase shifter using a first dedicated switch state associated with the first pair of switches, and the second receiver path is connected to the second phase shifter using a second dedicated switch state associated with the second pair of switches, and transmitting the downlink transmissions using the transmission beam and receiving the uplink transmissions using the first and the second receiving beams.

LIST OF DRAWINGS

In the following, the invention will be described in greater detail with reference to the embodiments and the accompanying drawings, in which FIG. 1 illustrates an example embodiment of a radio access network.

DESCRIPTION OF EMBODIMENTS

Figure 1:
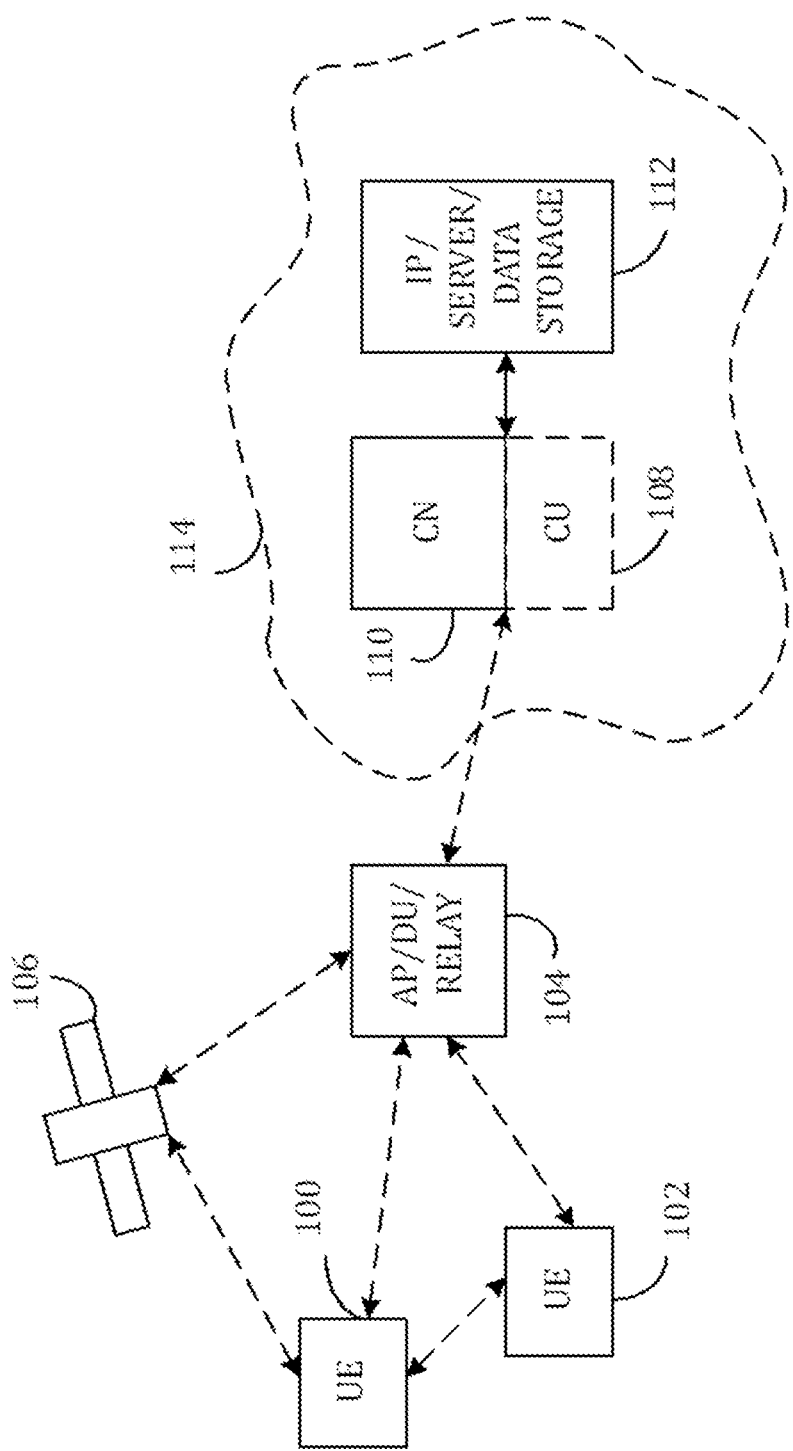

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor (s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G), as well as 5G-Advanced (i.e. 3GPP NR Rel-18 and beyond), mobile or cellular communication system. Also, the embodiments described herein may be implemented in a 6G communication system as well. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The wireless link from a terminal device to a (e/g)NodeB is called uplink or reverse link and the wireless link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require bringing the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/ mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SD N). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling or service availability in areas that do not have terrestrial coverage. Satellite communication may utilise geostationary earth orbit (GEO) satellite systems, but also low earth orbit (LEO) satellite systems, for example, mega-constellations. A satellite 106 comprised in a constellation may carry a gNB, or at least part of the gNB, that create on-ground cells. Alternatively, a satellite 106 may be used to relay signals of one or more cells to the Earth. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network may aggregate traffic from a large number of HNBs back to a core network.

In order to enhance capacity and coverage, massive Multiple Input Multiple Output (mMIMO) and beamforming techniques may be considered as useful techniques for enabling those aims. Additionally, phase array antennas may form a base line to realize those techniques. For example, beamforming in which multiple columns of antenna elements work together to create a high gain signal may be utilized for enhanced coverage and mMIMO utilizes multiple arrays of antennas, which may also be sub-arrays, to provide either spatial diversity by using multiple paths for the same signal for improved signal quality or increased throughput by transmitting multiple spatial layers which are combined at the receiver end. In some example embodiments, beamforming and mMIMO may be jointly deployed to combine the benefits of both techniques.

When utilizing antenna arrays, a plurality of antenna elements are combined to form a sub-array. A smaller sub-array, such as one sub-array forming one antenna element, combined with suitable spacing between them, provides more degrees of freedom with better antenna characteristics, but may increase cost and complexity of the as the number of sub-arrays is to be increased. The cost may increase for example because every sub-array requires a separate transmit receive (TRX) chain including power amplifier, low noise amplifier, circulator, DACs, ADCs, etc. whereas the complexity may increase because more processing power is needed to compute complex weights for every TRX branch which feeds the antenna port/sub-array. To address this issue, a full digital beamforming may be utilized. The number of TRX chains may be reduced while still having the ability to steer the beam by for example adding a phase shifter before selected sub-arrays, or antenna element, and by applying suitable phase shifts by controlling the phase shifters in an analogue manner.

Figure 2:
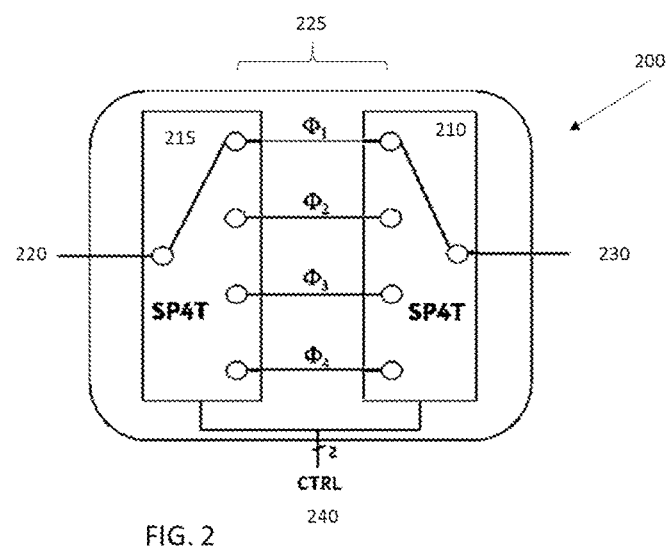
FIG. 2 illustrates an example embodiment of a phase shifter that comprises two switches.

FIG. 2 illustrates an example embodiment of a phase shifter 200 that comprises two switches 210 and 215 that are in this example embodiment Single Pole 4 Throw (SP4T) switches connected with delay lines 225. In this example embodiment, the switches 210 and 215 are highly linear high power switches. The phase shifter 200 also has an input 220, an output 230 and a 2-bit control (CTRL) pin 240. It is to be noted though that although the switches 210 and 215 in this exemplary embodiment are high power SP4T switches, the phase shifter could be also SPxT switches, in other words, the delays lines in this exemplary embodiment achieve four different phase shifts, but in some other exemplary embodiments, another number, that is x, of different phase shifts. The length of the different delay lines may be dependent on the antenna geometry and the layout. The phase shifter, and therefore the beam direction, may be controlled from the digital domain by beamforming commands. The digital domain may be used to steer the beam into the right direction and to determine the right settings for the analogue switch.

Figure 3:
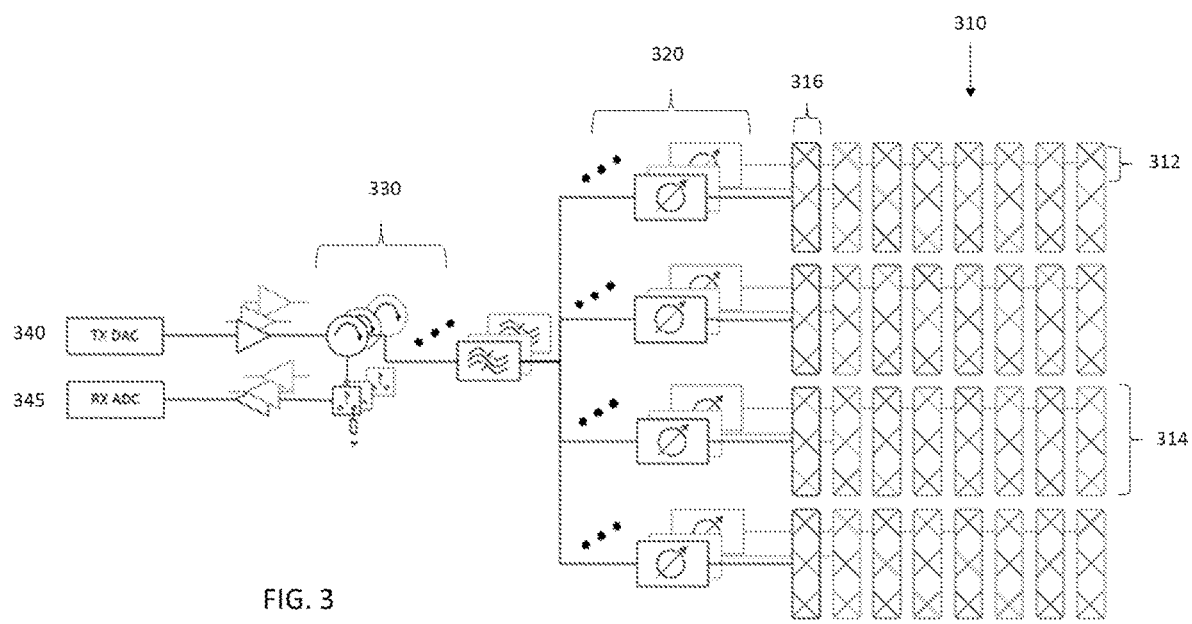
FIG. 3 illustrates an example embodiment in which phase shifters are used for enabling hybrid beamforming.

FIG. 3 illustrates an example embodiment in which phase shifters, such as phase shifter 200 illustrated in the example embodiment of FIG. 2, are used for enabling hybrid beamforming by placing phase shifters just before the antenna array, which reduces the need for components and also provides optimization of costs. In the example embodiment of FIG. 3, there is an antenna array 310 comprising antenna elements 312 that are part of antenna sub-arrays 314 and the antenna sub-arrays 314 are comprised in antenna columns 316. In this example embodiment, the antenna array 310 is comprised in a radio frequency (RF) front end that has 16 transmitter and 16 receiver lines (16T16R). In the RF front end, there are phase shifters 320 just before the antenna array 310. The phase shifters 320 are placed before the antenna sub-arrays 314. In this example embodiment, hybrid beamforming is performed in both uplink and downlink direction.

While using the phase shifters introduces benefits such as optimized cost with enhanced performance, adding such a switches-based phase shifter may also introduce insertion loss. The insertion loss may harm uplink performance, and, additionally, long physical uplink control channel (PUC CH) linked with frequency range 1 (FR1) that is used for channel state information (CSI) reporting and hybrid automatic repeat request (HARQ) acknowledgement/negative acknowledgement (ACK/NACK) may also introduce restrictions on system level, from radio resource management (RRM) perspective, as it is to be supported over multiple symbols. Such restrictions may limit the performance gains available in the uplink when using hybrid beamforming. As is illustrated in the example embodiment of FIG. 3, both uplink and downlink share the same path and are thereby exposed to same phase shifter insertion loss. Yet, uplink is more sensitive to losses as cells may be more limited in uplink. This issue may be further evident as frequencies get higher.

Figure 4B:
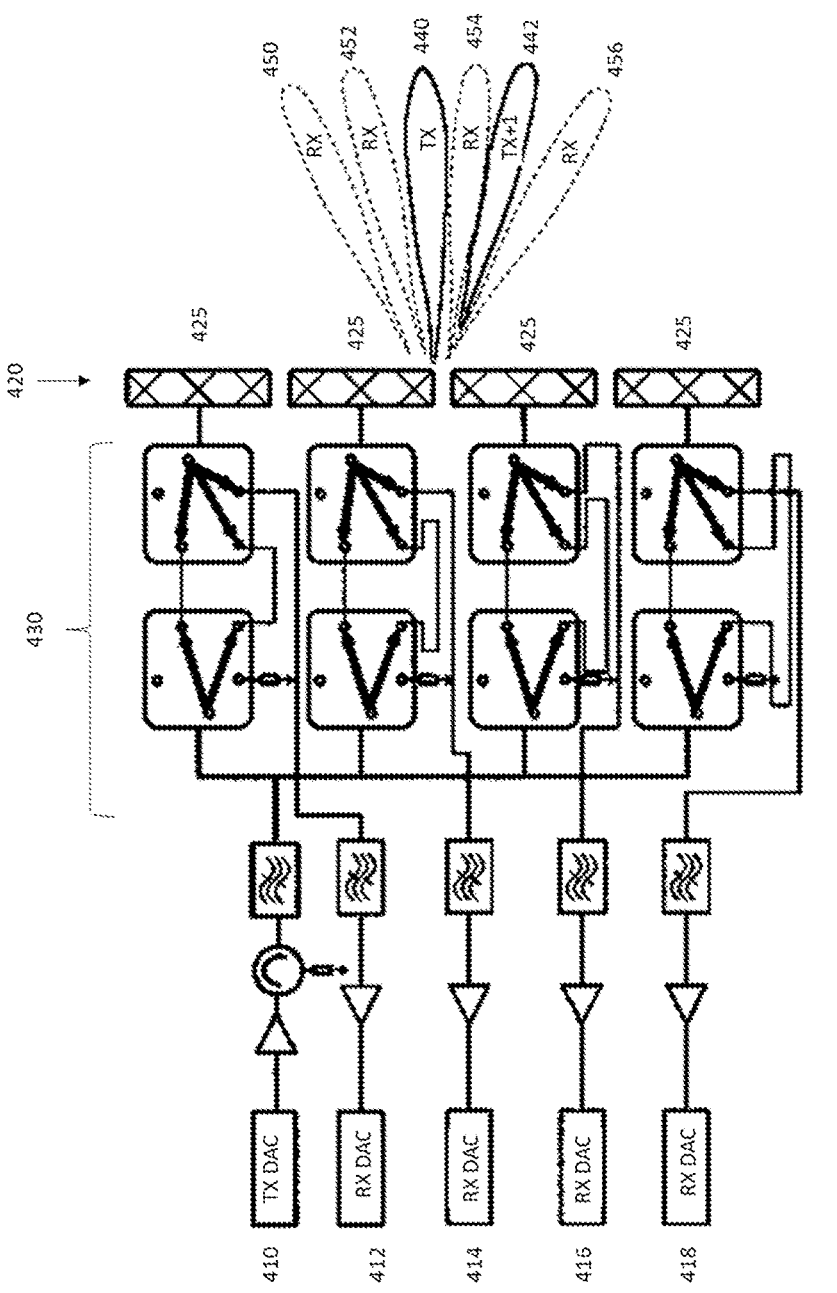
FIG. 4B illustrates an example embodiment of an architecture in which transmission path comprises hybrid beamforming while receiver path is optimized.
Figure 4A:
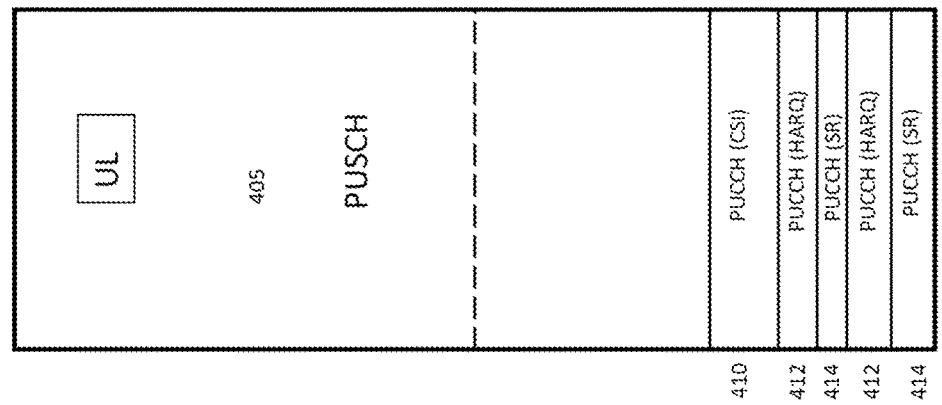
FIG. 4A illustrates an example embodiment of a physical uplink control channel configuration.

There may further be additional constraints due to there being a single analog beam available for utilization in vertical direction at a particular instant. The use of, for example, up to four narrow beams for hybrid beamforming performance may restrict usage of long PUCCH which may be understood as a PUCCH that is distributed over multiple symbols. A short PUCCH may then be understood as a PUCCH that is transmitted on one or two symbols. In long PUCCH energy is thus spread in time domain, which helps to increase coverage. FIG. 4A illustrates an example embodiment of a PUCCH configuration 400. In the configuration, there are resources allocated for PUCCH (CSI) 410, PUCCH (HARQ) 412 and PUCCH (scheduling request (SR)). With the PUCCH configuration 400, that is a long PUCCH, physical uplink shared channel (PUSCH) 405 is multiplexed in the same slot and/or symbol with hybrid beamforming. Thus, the resources are allocated over multiple timescales. The CSI and SR resources are configured using radio resource control (RRC) configuration, and therefore they may be expected to be allocated for the long-term, for example, as much as the entire length of the call of a terminal device served by the cell. This may be because RRC reconfigurations may incur non-negligible delays, and also involve additional control plane load, and hence are best avoided. During the course of this duration, it may be expected that the best analog beam for the terminal device may change. This may make it difficult to ensure that all the terminal devices, whose CSI and/or SR transmissions occur in a given slot, have the same analog beam.

The HARQ ACK/NACK resources are linked to the one or more downlink (DL) slots that have ACK/NACKs mapping to a current slot in the uplink (UL) direction. In FR1 time division duplex (TDD) using, for example, the slot format of DDDSU, there may be four DL and/or special slots that map their PUC CH HARQ ACK/NACK to the same UL slot. If the terminal devices that transmit their HARQ ACK/NACKs in a given UL slot are to have the same analog beam as their best beam, then the four DL slots that map to the same UL slot for ACK/NACK are also to schedule the terminal devices on the same analog beam, which may be a constraint which affects the gains of DL hybrid beamforming.

In addition to the possible conflicts between terminal devices transmitting CSI, SR, HARQ ACK/NACK, there may also be a conflict with what is best from a PUSCH perspective. In UL, power constraints of terminal devices may mean that the terminal devices in the cell edge need to be allocated a smaller number of physical resource blocks (PRBs) depending on pathloss conditions of the terminal devices, which then necessitates increased need for frequency division multiplexing (FDM) of the terminal devices to fully utilize available system bandwidth. Thus, it is beneficial to have a solution that best handles the above-mentioned UL issues such that the DL hybrid beamforming gains and cost advantages are still preserved.

In some example embodiments, an uplink optimized architecture with different beamforming approaches for downlink and uplink may be utilized as an approach to implement a solution handling the above-mentioned UL issues such that the DL hybrid beamforming gains and cost advantages are still preserved. Instead of performing beamforming in the elevation in analog RF domain and beamforming in the horizontal in the digital domain or vice versa, analog beamforming and the digital beamforming may be combined either in elevation or in azimuth separately for downlink and uplink. Phase shifters comprising switches and delay lines, such as phase shifter 320 introduced in the example embodiment of FIG. 2, may be utilized for the approach as those may introduce the benefit of being cost effective and efficient. For example, in a 16T64R like architecture uplink may remain optimized while downlink coverage may be enhanced using hybrid beamforming. It is to be noted, though, that the same approach may be used for other number of transmitters (TRX) for higher frequency ranges as well.

Yet, using a phase shifter may introduce an additional insertion loss that is common for both uplink and downlink directions. Therefore, an uplink optimized hybrid beamforming architecture may be utilized. FIG. 4B illustrates an example embodiment of an architecture in which transmission (Tx) path comprises hybrid beamforming while receiver path is optimized. In this example embodiment, there is a single Tx path 410 for a one antenna column 420, which may be understood as a complete antenna column. The Tx path 410 comprises four phase shifters 430 for four antenna sub-arrays 425 that enable analog beamforming for downlink beams 440 and 442, which are in this example sequential beams. For example, up to three sequential beams, pointing into different vertical directions, may be applied using the configuration illustrated in this example embodiment.

In this example embodiment, for the uplink side, there are four separate Rx paths 412, 414, 416 and 418 for the four antenna sub-arrays. The four Rx paths in this example embodiment comprise each a switch port that is connected to the antenna sub-array for which Rx path is. This may be achieved by dedicating one of the four states of a switch comprised in the respective phase shifter 430, for example of the switch that is closer to the antenna sub-array, and thereby enabling full digital beamforming for the uplink. The uplink beams 450, 452, 454 and 456 may thus be received using digital beam detection and they may be received during one instance instead of sequentially. It is to be noted that the antenna sub-arrays, in this example embodiment the four antenna sub-arrays corresponding to the four separate Rx paths 412, 414, 416 and 418, may each define a vertical range within which there may be a flexible number of concurrent receiving beams. In other words, an individual antenna sub-array is capable of providing a plurality of concurrent receiving beams. The number of receiving beams provided by the antenna sub-arrays be dependent on traffic situation. Thus, in this example embodiment, there are four receiving paths in the antenna column 420 for one polarization and these paths may enable full digital beamforming for uplink the same way as when using 64T64R products.

This example embodiment may introduce benefits such as significant reduction of the insertion loss and enabling uplink performance at a similar level as compared to using a 64T64R implementation with full digital beamforming. The hardware (HW) architecture introduced in this example embodiment may enable all features of the digital beamforming in the uplink. The usage of digital beam detection may further have the benefit that the direction of a terminal device and the existence of different beams, such as the Rx beams 450, 452, 454 and 456, for mMIMO may be detected. As such, the direction of the terminal device and the beam direction may be detected in the elevation and azimuth simultaneously, while also achieving cost savings by reducing the number of Tx line-ups. A further benefit of this example embodiment is that using the hybrid beamforming architecture for downlink enables the usage of a 16TX64RX module instead of 64T64R in a dense urban scenario with high rise buildings.

Figure 4C:
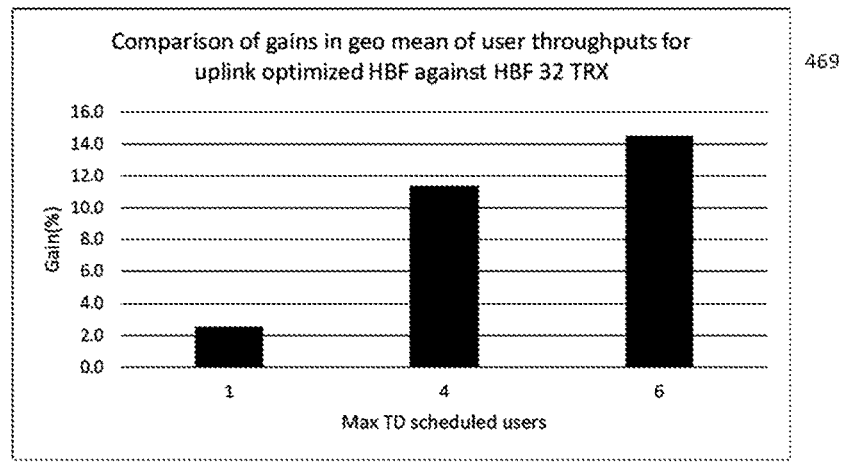
FIGS. 4C and 4D illustrate graphs for comparing performances of different use cases.

FIG. 4C illustrates a graph 460 in which the architecture introduced in the example embodiment of FIG. 4A compares the geometric mean of user throughputs for hybrid beamforming 32 TRX architecture with the uplink optimized hybrid beamforming for digital beamforming on the uplink. The results illustrate a full-buffer system simulations with 10 users per cell using a 100 MHz bandwidth carrier at 3.5 GHz carrier frequency. The usage of full digital beamforming on the uplink is not limited by the constraint of using a single analog beam in the elevation thus allowing users to be frequency division multiplexed without a need to consider their best analog beam. This helps improve PUSCH performance due to the improved PRB utilization, that may otherwise be limited due to unavailability of sufficient number of users on a single analog elevation beam for example, and without forcing use of a wide beam on PUSCH or a narrow analog beam that is not the best beam across users to allow multiplexing of PUSCH and PUC CH reception in a slot.

Figure 4D:
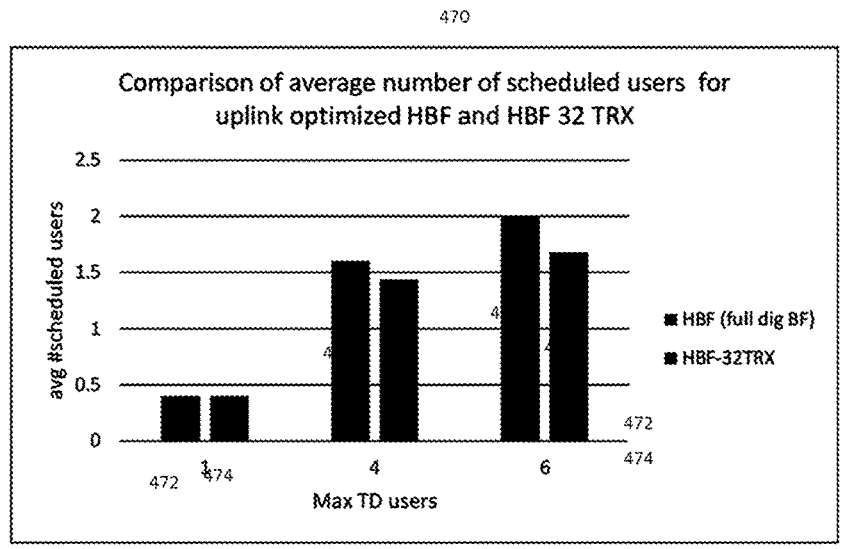

FIG. 4D illustrates a graph 470 in which the architecture of the example embodiment illustrated in FIG. 4B is compared, in terms of an average number of scheduled users, to an average number of scheduled users when hybrid beamforming is used and the uplink is optimized 472 and a system with 32 TRX 474. As illustrated already by the graph in FIG. 4C, with uplink optimized hybrid beamforming improved geometric mean performance may be obtained, and the gain percentage increases with increase in maximum number of scheduled users. This improvement in gain in system performance may be, at least partly, because the users are not constrained to belong to a single elevation analog beam. The difference in number of scheduled users on average may thus also be seen from the graph 470 that provides a comparison of scheduled users under both scenarios, which shows that the full digital solution is able to schedule more number of users per slot. The difference in number of scheduled users on average increases with the maximum allowed number of scheduled users, as, with a smaller number of allowed users, only a limited number of users can be scheduled with either solution.

Figure 5:
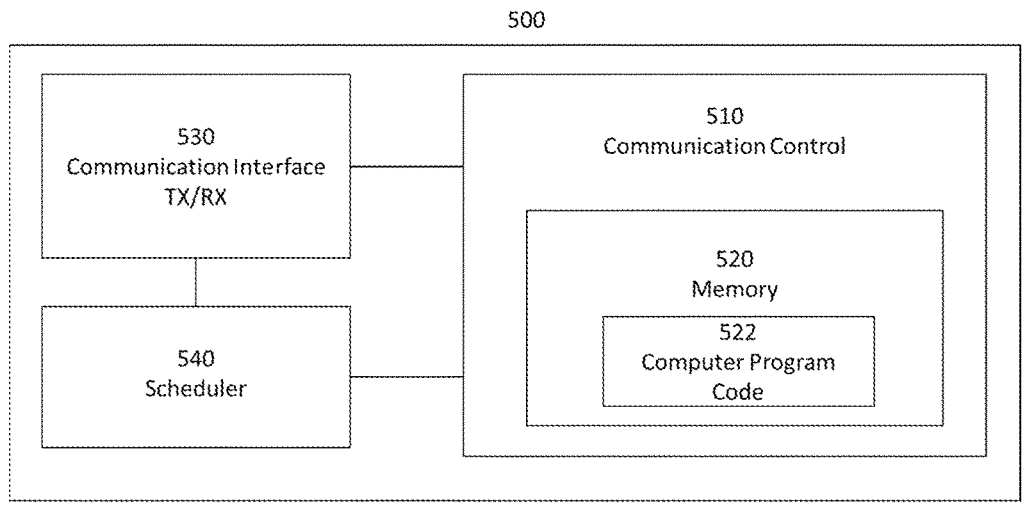
FIG. 5 illustrates an example embodiment of an apparatus.

The apparatus 500 of FIG. 5 illustrates an example embodiment of an apparatus that may be an access node or be comprised in an access node, and that may embody the architecture used for beamforming described above. The apparatus may further be configured to determine transmission and/or receiving beams and to provide beamforming instructions regarding determined beams as well as to transmit and receive transmissions using the determined beams. The apparatus may be, for example, a circuitry or a chipset applicable to an access node to realize the described embodiments. The apparatus 500 may be an electronic device comprising one or more electronic circuitries. The apparatus 500 may comprise a communication control circuitry 500 such as at least one processor, and at least one memory 520 including a computer program code (software) 522 wherein the at least one memory and the computer program code (software) 522 are configured, with the at least one processor, to cause the apparatus 500 to carry out any one of the example embodiments of the access node described above.

The memory 520 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 500 may further comprise a communication interface 530 comprising hardware and/or software for realizing communication connectivity according to one or more communication protocols. The communication interface 530 may provide the apparatus with radio communication capabilities to communicate in the cellular communication system. The communication interface may, for example, provide a radio interface to terminal devices. The apparatus 500 may further comprise another interface towards a core network such as the network coordinator apparatus and/or to the access nodes of the cellular communication system. The apparatus 500 may further comprise a scheduler 540 that is configured to allocate resources.

Even though the invention has been described above with reference to example embodiments according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:

at least one processor; and at least one memory storing instructions that, when executed by the at least one processor, to cause the apparatus at least to:

determine a transmission beam for downlink transmissions;

provide first beamforming instructions, for forming the transmission beam, to a transmission path comprising a digital to analog converter and an antenna column that comprises at least a first antenna sub-array and a second antenna sub-array and wherein, along the transmission path, the first antenna sub-array is connected to a first phase shifter comprising a first pair of switches connected using delay lines, and the second antenna sub-array is connected to a second phase shifter comprising a second pair of switches connected using delay lines, and wherein the first phase shifter and the second phase shifter are both connected to the digital to analog converter;

determine, for the first antenna sub-array, at least one receiving beam that is a first receiving beam, and for the second antenna sub-array, at least one receiving beam that is a second receiving beam for receiving uplink transmissions, wherein the first antenna sub-array is configured to provide a first plurality of concurrent receiving beams and the second antenna sub-array is configured to provide a second plurality of concurrent receiving beams;

provide second beamforming instructions, for forming at least the first receiving beam and at least the second receiving beams, to a first receiving path and a second receiving path, respectively, wherein the first receiving path comprises the first phase shifter that is connected to the first antenna sub-array and to a first analog to digital converter, and the second receiving path comprises the second phase shifter that is connected to the second antenna sub-array and to a second analog to digital converter, and wherein the first receiver path is connected to the first phase shifter using a first dedicated switch state associated with the first pair of switches, and the second receiver path is connected to the second phase shifter using a second dedicated switch state associated with the second pair of switches; and transmit the downlink transmissions using the transmission beam and receive the uplink transmissions using the first and the second receiving beams.

2. The apparatus according to claim 1, wherein the apparatus is further caused to perform beamforming of the first and the second receiving beams in a digital domain.

3. The apparatus according to claim 1, wherein the first dedicated switch state, associated with the first pair of switches, is a state of the switch, comprised in the first pair of switches, that is closer to the first antenna sub-array, and the second dedicated switch state, associated with the second pair of switches, is a state of the switch, comprised in the second pair of switches, that is closer to the second antenna sub-array.

4. The apparatus according to claim 1, wherein the antenna column comprises third antenna sub-array that is connected to a third phase shifter that comprises a third pair of switched connected using delay lines, and the third phase shifter is comprised in the transmission path and is further connected the digital to analog converter, and wherein the third phase shifter is comprised in a third receiving path and is further connected to a third analog to digital converter comprised in the third receiving path.

5. The apparatus according to claim 4, wherein the apparatus is further caused to determine a third receiving beam for receiving the uplink transmission and the second beamforming instructions further comprise instructions for forming the third receiving beam.

6. The apparatus according to claim 1, wherein the pairs of switches are controlled using their respective control interfaces.

7. The apparatus according to claim 1, wherein at least one switch comprised in the phase shifters is configured to have four different states.

8. The apparatus according to claim 1, wherein the apparatus is comprised in an access node.

9. A method comprising:
  determining a transmission beam for downlink transmissions;
  providing first beamforming instructions, for forming the transmission beam, to a transmission path comprising a digital to analog converter and an antenna column that comprises at least a first antenna sub-array and a second antenna sub-array and wherein, along the transmission path, the first antenna sub-array is connected to a first phase shifter comprising a first pair of switches connected using delay lines, and the second antenna sub-array is connected to a second phase shifter comprising a second pair of switches connected using delay lines, and wherein the first phase shifter and the second phase shifter are both connected to the digital to analog converter;
  determining, for the first antenna sub-array, at least one receiving beam that is a first receiving beam, and for the second antenna sub-array, at least one receiving beam that is a second receiving beam for receiving uplink transmissions, wherein the first antenna sub-array is configured to provide a first plurality of concurrent receiving beams and the second antenna sub-array is configured to provide a second plurality of concurrent receiving beams;
  providing second beamforming instructions, for forming at least the first receiving beam and at least the second receiving beams, to a first receiving path and a second receiving path, respectively, wherein the first receiving path comprises the first phase shifter that is connected to the first antenna sub-array and to a first analog to digital converter, and the second receiving path comprises the second phase shifter that is connected to the second antenna sub-array and to a second analog to digital converter, and wherein the first receiver path is connected to the first phase shifter using a first dedicated switch state associated with the first pair of switches, and the second receiver path is connected to the second phase shifter using a second dedicated switch state associated with the second pair of switches; and
  transmitting the downlink transmissions using the transmission beam and receiving the uplink transmissions using the first and the second receiving beams.

10. The method according to claim 9, wherein the method further comprises performing beamforming of the first and the second receiving beams in a digital domain.

11. The method according to claim 9, wherein the first dedicated switch state, associated with the first pair of switches, is a state of the switch, comprised in the first pair of switches, that is closer to the first antenna sub-array, and the second dedicated switch state, associated with the second pair of switches, is a state of the switch, comprised in the second pair of switches, that is closer to the second antenna sub-array.

12. The method according to claim 9, wherein the antenna column comprises third antenna sub-array that is connected to a third phase shifter that comprises a third pair of switched connected using delay lines, and the third phase shifter is comprised in the transmission path and is further connected the digital to analog converter, and wherein the third phase shifter is comprised in a third receiving path and is further connected to a third analog to digital converter comprised in the third receiving path.

13. The method according to claim 12, wherein the method further comprises determining a third receiving beam for receiving the uplink transmission and the second beamforming instructions further comprise instructions for forming the third receiving beam.

14. The method according to claim 9, wherein at least one switch comprised in the phase shifters is configured to have four different states.

15. A non-transitory computer readable medium comprising program instructions stored thereon for performing at least the following:
  determining a transmission beam for downlink transmissions;
  providing first beamforming instructions, for forming the transmission beam, to a transmission path comprising a digital to analog converter and an antenna column that comprises at least a first antenna sub-array and a second antenna sub-array and wherein, along the transmission path the first antenna sub-array is connected to a first phase shifter comprising a first pair of switches connected using delay lines, and the second antenna sub-array is connected to a second phase shifter comprising a second pair of switches connected using delay lines, and wherein the first phase shifter and the second phase shifter are both connected to the digital to analog converter;
  determining, for the first antenna sub-array, at least one receiving beam that is a first receiving beam, and for the second antenna sub-array, at least one receiving beam that is a second receiving beam for receiving uplink transmissions, wherein the first antenna sub-array is configured to provide a first plurality of concurrent receiving beams and the second antenna sub-array is configured to provide a second plurality of concurrent receiving beams;
  providing second beamforming instructions, for forming at least the first receiving beam and at least the second receiving beams, to a first receiving path and a second receiving path, respectively, wherein the first receiving path comprises the first phase shifter that is connected to the first antenna sub-array and to a first analog to digital converter, and the second receiving path comprises the second phase shifter that is connected to the second antenna sub-array and to a second analog to digital converter, and wherein the first receiver path is connected to the first phase shifter using a first dedicated switch state associated with the first pair of switches, and the second receiver path is connected to the second phase shifter using a second dedicated switch state associated with the second pair of switches; and
  transmitting the downlink transmissions using the transmission beam and receiving the uplink transmissions using the first and the second receiving beams.

* * * * *